United States Patent [19]
Bullis et al.

[11] Patent Number: 4,463,729
[45] Date of Patent: Aug. 7, 1984

[54] METHOD AND APPARATUS FOR CONTROLLING FUEL INJECTION TIMING IN A COMPRESSION IGNITION ENGINE

[75] Inventors: Robert H. Bullis, Avon, Conn.; Robert A. DiDomenico, Ludlow, Mass.; John A. Kimberley, East Granby; Thomas M. McHugh, Manchester, both of Conn.; Christopher A. Parent, West Springfield; James R. Voss, Wilbraham, both of Mass.; Walter J. Wiegand, Glastonbury, Conn.

[73] Assignee: AMBAC Industries, Incorporated, Springfield, Mass.

[21] Appl. No.: 551,791

[22] Filed: Nov. 14, 1983

Related U.S. Application Data

[60] Division of Ser. No. 532,293, Sep. 14, 1983, , which is a continuation of Ser. No. 286,130, Jul. 23, 1981, abandoned.

[51] Int. Cl.$^3$ .............................................. F02M 51/00
[52] U.S. Cl. .................................. 123/478; 123/435; 123/501; 73/117.3
[58] Field of Search ............... 123/478, 486, 435, 425, 123/500, 501; 73/116, 119, 117.3; 431/13

[56] References Cited

U.S. PATENT DOCUMENTS

| | | | |
|---|---|---|---|
| 2,523,017 | 9/1950 | Harrison | 177/311 |
| 2,841,979 | 7/1958 | Harbert | 73/35 |
| 3,051,035 | 8/1962 | Root | 88/1 |
| 3,726,608 | 4/1973 | Bostwick et al. | 417/212 |
| 3,978,720 | 9/1976 | Ford | 73/116 |
| 4,033,310 | 7/1977 | Nicolls | 123/139 |
| 4,130,097 | 12/1978 | Ford | 123/117 R |
| 4,151,815 | 5/1979 | Bramwell et al. | 123/486 |
| 4,181,944 | 1/1980 | Yamauchi et al. | 364/431 |
| 4,232,545 | 11/1980 | Dobler et al. | 73/35 |
| 4,265,200 | 5/1981 | Wessel et al. | 123/501 |
| 4,314,534 | 2/1982 | Nakajima et al. | 123/478 |
| 4,327,691 | 5/1982 | Moser | 123/478 |
| 4,331,029 | 5/1982 | Wilson | 73/117.3 |
| 4,337,648 | 7/1982 | Gillespie | 73/119 A |
| 4,377,086 | 3/1983 | Linder et al. | 73/75 |
| 4,377,140 | 3/1983 | Latsch | 123/415 |
| 4,381,748 | 5/1983 | Eckert et al. | 123/414 |
| 4,397,283 | 8/1983 | Komaroff et al. | 123/494 |

OTHER PUBLICATIONS

"Diesel Injection Timed via Microwave Method", by Krage et al., SAE, Inc., Mar. 1982, pp. 59–63.
Snap-On MT 480 Diesel Timing Meter, Instructions—date uncertain—received Oct. 1981.
Snap-On Diesel Timing Meter—bears date of Jul. 7, 1981-received Oct. 1981.
Doctoral Thesis entitled "Diesel Combustion", by Phillip Samuel Myers—Title page, page, pp. 92–94 and 216—Submitted to University of Wisconsin in 1947, and presently indexed and available thereat.
Paper entitled "Instrumentation in the Study of Diesel Combustion", by E. W. Landen and L. A. Blanc, published in the Transactions, A.S.M.E., vol. 65, 1943, pp. 121–125.
Published PCT Patent Application entitled "Method and Apparatus for Measurement of Engine Ignition Timing", by S. E. Wilson, International Appln. No. PCT/US81/00782.
Prof. Dr. Engineer Ko Terada, Determination of Combustion Characteristics in a Divided Chamber Diesel Engine, MTZ 40, (1979), 5, pp. 237–243.

Primary Examiner—Parshotam S. Lall
Attorney, Agent, or Firm—Stephen A. Schneeberger

[57] ABSTRACT

The method and apparatus for generating start of combustion signals associated with the combustion events in a diesel engine, and for using such signals to control the timing of fuel delivery to the engine. The combustion event is sensed, as by an electrostatic or optical sensor, and signal conditioning circuitry provides a start-of-combustion signal which is directly and precisely indicative of the time of the onset of combustion. The sensors include self-cleaning capabilities for extended operating life on an engine. The sensors may be incorporated in the structure of a glow plug.

The SOC signal is advantageously supplied to a timing control circuit which delivers a timing control signal to a fuel delivery device, such as the controller associated with a fuel pump. The control circuit stores one or more start of combustion values which indicate the desired timing, relative to an engine cycle, for the start of the combustion event as a function of speed and load. One or more adjustment signals are stored and applied as a function of speed and load to adjust the desired signal such that the control signal is corrected for delays. The actual SOC signal is compared with the desired signal to generate an error signal which may be used to finely adjust the stored $\Delta$SOC signal for particular speed and load conditions.

10 Claims, 7 Drawing Figures

METHOD AND APPARATUS FOR CONTROLLING FUEL INJECTION TIMING IN A COMPRESSION IGNITION ENGINE

DESCRIPTION

This is a division of application Ser. No. 532,293 filed on Sept. 14, 1983, which is a continuation of application Ser. No. 286,130 filed on July 23, 1981, now abandoned.

1. Technical Field

This invention relates to the control of fuel injection timing in compression ignition engines and more particularly to the control of such fuel injection timing based on the measured timing of the onset of combustion. The invention additionally relates to the development of timing signals which are accurately and directly representative of the onset of combustion in a combustion chamber of the engine.

2. Background Art

Continuing requirements to achieve improved fuel efficiency and reduced exhaust gas emissions of compression ignition engines, hereinafter referred to as diesel engines, has stimulated the development of electronically controlled fueling systems offering the potential for providing more precise engine control. The gains achievable in diesel engine performance through the introduction of electronic fuel controls depend to a great extent on the control strategy implemented, the accuracy to which specific engine operating parameters can be measured and controlled and the ability to maintain such control throughout the operational life of the engine.

In compression ignition engines, one of the most critical operating parameters is fuel injection timing. Presently, control of the time of injection is determined mechanically and/or hydraulically. The timing function has typically relied only upon measurements of mechanical timing points, such as crank angle, flywheel position, piston position and/or injector actuation to provide the requisite timing control. While such control was historically effected mechanically and/or electro-mechanically, recent developments have placed increasing emphasis on the utilization of electronics. Representative of these timing techniques and implementations are U.S. Pat. Nos. 4,033,310 and 4,265,200 which sense injector actuation to provide corrective feedback information to electronic controls which determine and control the timing of fuel delivery, or injection, by fuel delivery apparatus.

Those systems, however, fail to provide for the fact that in diesel engines, unlike spark ignition engines, the start of combustion within the cylinder does not directly relate under most circumstances to the mechanical timing point, such as injector actuation. Engine operating conditions such as cylinder wall temperature, air inlet temperature, engine load and speed and fuel quality all influence the specific point or time in the engine cycle at which combustion takes place within the cylinder. An additional complication is the contemplated introduction of a broad spectrum of new fuels, fuel blends (i.e. alcohol and water emulsions), and synthetic fuels widely ranging in cetane rating. These factors combine to introduce a variable delay between the time of fuel injection and the start of combustion which may typically be 5°-20° of crank angle. To accommodate such variations in the onset of combustion introduced by the above factors, the purely mechanical timing system must be augmented with precise information on the aforementioned engine operating parameters, as well as with a direct measurement of fuel quality (cetane rating) and fuel density. From this information, it then becomes possible to estimate the instant at which combustion begins. Obviously, the complexity of this approach along with the large number of required sensor inputs limits accuracy and practicability. Furthermore, this approach can, at best, provide only an estimate of the onset of combustion and cannot provide compensation for engine variables.

While the introduction of electronic control systems to diesel engines is relatively new, considerable development has occurred with spark ignition gasoline engines. Specifically, efforts have been made to improve spark ignition engine performance via the electronic controls associated with engines. For instance, in U.S. Pat. No. 4,181,944, which in turn refers to a different Japanese patent application KoKai (laid-open) No. 4903/72, there is a general discussion of using combustion pressure sensors for monitoring the pressure in one or more engine cylinders and for modifying a previously-stored spark ignition timing scheme if the sensed pressure indicates deterioration of the cylinder pressure. Mention is also made of sensing the ion current in the spark plugs in lieu of a pressure measurement. These techniques, however, are intended for use with spark ignition engines and do not sense the timing of the combustion event, but rather its quality.

Various techniques other than an analysis of pressure have also existed for indicating some combustion-related characteristics of an engine. Two such examples, U.S. Pat. Nos. 2,523,017 and 4,232,545, utilize an ionic current detector to detect knocking or "detonation" in a spark ignited engine, either for analytical or corrective control purposes. U.S. Pat. No. 3,051,035 describes an optical combustion monitoring device for detecting a flame-out condition in aircraft jet engines. However, these patents are not concerned with the timing of the onset of combustion nor with the development of a timing signal for a diesel engine, nor specifically with control of fuel injection timing based on a direct measurement of the onset of combustion.

Accordingly, it is a principal object of the present invention to provide improved control of the timing of fuel delivery in diesel engines. Included within this object is the provision of a method and apparatus for controlling such fuel delivery in an accurate and precise manner as a function of the onset of combustion in the engine.

It is a further object of the invention to provide apparatus for accurately sensing the onset of combustion and generating corresponding start-of-combustion timing signals therefrom. Included within this object is the provision of such apparatus which is relatively durable and long lived, yet relatively inexpensive.

In accordance with one aspect of the invention, there is provided the method of and apparatus for controlling fuel delivery in a compression ignition engine at least partly as a function of the onset of combustion in the engine. Command signals indicative of the desired start-of-combustion timing are provided as a function of engine operating parameters and are utilized in open-loop manner to control the timing of fuel delivery. The command signals are modified or trimmed as necessary to correct for the variable delays which generally occur between the time (i.e. engine crank angle) of the fuel delivery and the start of combustion. The appropriate correction of those control signals is achieved by detecting the actual instant of the start-of-combustion in a respective combustion chamber, comparing that actual time (i.e. crank angle) with the time which was desired, thereby to detect any error, and correcting the original control signal by an amount equal to or proportional to the error. The desired start of combustion values may be previously determined and stored for a full range of engine speeds and loads. The correction signals may also be stored as a function of engine speeds and loads and may be periodically updated by the determined error values. Specifically, the correction signals may be updated or modified by numerically filtering the error signal to limit its immediate impact on the correction signal. This is desirable because of a small but finite statistical variation associated with the actual combustion event, and thereby lends stability to the control system. The processing of error values is done in a manner providing dynamic and accurate correction for the control signal even though non-monitored engine operating conditions may change. Provision is made for a cold-starting advance.

In accordance with another aspect of the invention, a signal generator is provided for responding to a direct property of the combustion occurring in a cylinder to generate a timing signal indicative of the onset of combustion. A sensor in communication with a cylinder combustion chamber detects the particular property of combustion being monitored, the level of that detected property normally changing at a rapid rate, typically increasing, at the onset of combustion. The sensed property is then converted, as by signal conditioning means, to an electrical timing signal which accurately indicates the onset of combustion.

The start of combustion signal generator is employed in combination with the fuel delivery control system of the engine throughout operation of the system to provide dynamic control.

BEST MODE FOR CARRYING OUT THE INVENTION

The onset of combustion in the cylinder of a diesel engine is accompanied by a rapid change in several phenomena within or near the combustion chamber, including a pressure rise, the production of charged particles, the emission of photons, a rise in temperature, an increase in the acoustic noise level and the like. On an experimental basis, as in a laboratory, the pressure rise can be employed to determine the point in the engine cycle at which combustion commences. However, the large change in pressure produced by the compression stroke may to some extent mask the change in pressure resulting from the combustion process. Additionally, pressure transducers having sufficient life expectancy for mass-market utilization on diesel engines are relatively expensive at present for that particular application. Furthermore, engine designers in an effort to reduce diesel engine noise are attempting to minimize in more modern engine designs the rate of pressure rise produced by the combustion process. Accordingly, at least at present, some of the other mentioned physical phenomena appear to present equal or better opportunity for detecting the onset of combustion. Those phenomena should, and generally do, exhibit a rapid and substantial level change at the onset of combustion. By using one or more of such phenomena, a signal herein designated "start of combustion" can be obtained and developed, which signal is indicative of the actual beginning of combustion in the combustion chamber. Typically, this signal determines the start of combustion to an accuracy of less than one engine crank angle degree.

To such phenomena accompanying the onset of combustion and serving to illustrate the principles of the invention are the production of significant levels of excitation and ionization. The excitation manifests itself in the emission of electromagnetic radiation, such as light. Direct measurements of either the emitted light or ionization levels resulting from the in-cylinder combustion process have been found to provide highly accurate and repeatable indications of the onset of combustion within the cylinder. Furthermore, the output signal levels from either optical or electrostatic detectors have been found to be more than adequate for measurement purposes under a wide range of engine operating conditions.

Figure 1:
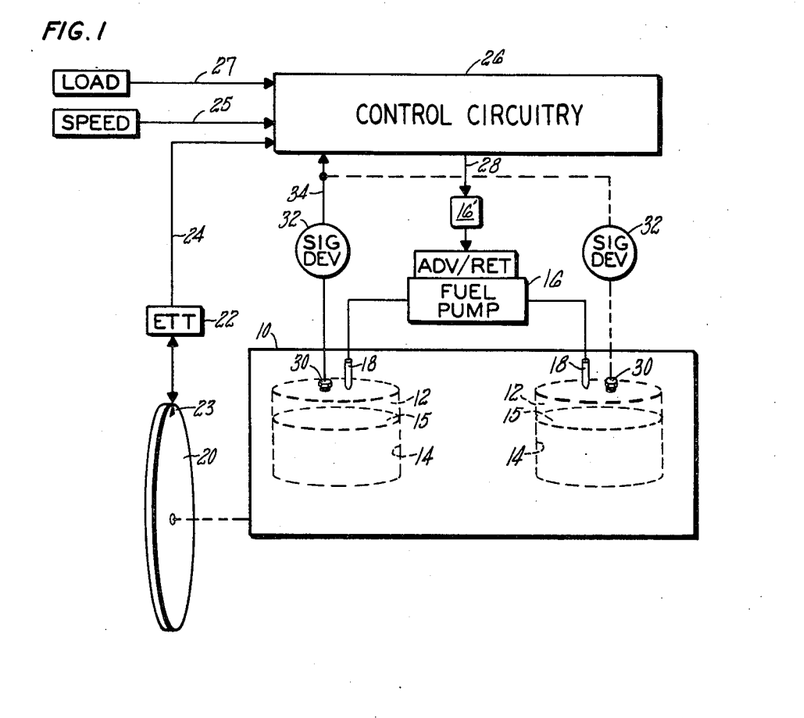
FIG. 1 is a block diagram illustrating the diesel engine fuel control system including the signal generator for indicating the start of combustion.

Referring to FIG. 1, there is diagrammatically illustrated a multicylinder internal combustion engine 10 of the compression ignition, or diesel, type. Fuel is delivered in a predetermined sequence to the respective combustion chambers 12 of the respective cylinders 14 by a fuel delivery system including fuel delivery apparatus 16 and suitable injectors 18. The fuel is injected into the respective combustion chambers 12 by means of the injectors 18. As used herein, the term "combustion chamber" is intended to also include the prechamber on some diesel engines where combustion "first" begins, such engines being of the "indirect" injection type.

Some cyclically moving portion of engine 10, as for instance flywheel 20, is monitored, as by engine timing transducer 22, to provide periodic signals indicative of the position of certain parts of the engine. More specifically, transducer 22 generates a pulse each time a reference mark 23 on flywheel 20 passes. The reference mark typically indicates some crank angle, as for instance zero, when one specific piston is at a known position such as its top dead center position, and provision may be made for responding only to top-dead center indications at the completion of a respective compression stroke. Moreover, that engine timing signal might be generated at a predetermined angle, e.g. 120° before top dead center. It will be appreciated that some other moving component of the engine or fuel pump might be monitored to provide the engine timing signal 24 provided by transducer 22. Engine timing signal 24 is a principal input signal to on-board control circuitry 26 which provides a timing control signal 28 to the fuel delivery apparatus 16 as will be described. Control circuitry 26 also receives other inputs representative of other engine operating conditions as derived from suitable sensors of known design, such as input 25 representative of engine speed and input 27 representative of engine load (i.e. throttle rack position). The fuel delivery apparatus 16 is also responsive to fuel quantity control signals (not shown) to deliver a controlled quantity of fuel. The fuel quantity control signals are functions of foot pedal position and engine governor characteristics, and their development can be provided mechanically or electronically in a known manner not forming part of the present invention.

Fuel delivery apparatus 16 may typically be a diesel fuel injection pump, such as the Model 100 injection pump manufactured by American Bosch and disclosed in U.S. Pat. No. 3,726,608, capable of delivering a pressurized charge of fuel to each of the injectors 18 at the appropriate time and in sequence for injection into the respective combustion chambers 12. The fuel pump is mechanically driven by the engine and derives its basic, or reference, timing in that manner. However, the timing of the delivery of those fuel charges to and through the injectors and into the combustion chamber 12 may be varied by advancing or retarding the timing cam of the fuel pump in response to engine operating parameter of speed and load.

The advance/retard timing mechanism of the fuel delivery apparatus typically comprises a piston and cylinder arrangement in which displacement of the piston acts either directly or indirectly to azimuthally rotate a ring on which one or more timing cams is positioned. The displacement of the piston may be done hydraulically, in the general manner of U.S. Pat. Nos. 4,265,200 and 4,033,310. Some type of actuator 16', as for instance a stepper motor, a torque motor or the like, responds to control signal 28 from control circuit 26 for controlling the advance/retard mechanism.

Finally, if the fuel injectors are of the solenoid-actuated type, fuel delivery timing is done directly at the injector solenoid in response to control signal 28 which then must be expressed and utilized as a time signal, relative to some crank angle, rather than a cam angle displacement signal. In such instance, the injector solenoid is analogous to controller 16' insofar as it effects the desired timing of fuel delivery.

In accordance with the invention, a further signal is provided in addition to engine timing signal 24, engine speed signal 25 and engine load signal 27, which is indicative of the response of a specific cylinder 14 to the injection of fuel. More particularly, one or more sensors 30 responsive to some sensible phenomenon coincident with and changing sufficiently rapidly to be accurately indicative of the onset of combustion in respective combustion chambers 12, for instance, the electromagnetic radiation or the ionization accompanying the onset of combustion, operate in conjunction with signal developing circuitry 32 to provide respective start-of-combustion (hereinafter referred to as SOC) timing signals 34.

SOC timing signal 34 is applied as an input to control circuitry 26 for precisely and accurately indicating the instant of the actual onset of combustion within a respective combustion chamber 12 for successive combustion cycles of the respective cylinder 14. The sensor 30 provides SOC timing signals 34 to on-board control circuitry 26 throughout the operation of engine 10 in a vehicle and is thus able to provide a continuous dynamic control function. The SOC timing signal 34 is utilized for the development of an error signal which may then be used in various ways, depending upon the control strategy of control circuit 26, to provide and/or modify dynamically the fuel delivery timing control signal 28.

The aforementioned U.S. Pat. No. 4,265,200, incorporated herein by reference, discloses one possible configuration for the present control circuitry broadly represented by block 26 in FIG. 1 herein, subject to the following modifications. Firstly, and most importantly, the engine performance curves stored in memory are predicated on the desired timing (i.e. angle) of the start of combustion as a function of engine operating conditions. Correspondingly, the parameter sensed and fed back for comparison is the timing of the start of combustion, i.e. the present SOC signal 34, rather than an indication of the start of injection. Additionally, because the combustion event in a cylinder is statistical in nature, suitable numerical processing is preferably employed to derive a timing signal. This can be accomplished directly by employing, for example, a first order numerical filter or by utilizing a running numerical average of the SOC signal. Also appropriate signal processing is employed to accommodate the situation when no combustion occurs in cylinder, as experienced when operating a vehicle with a closed fuel rack.

The aforementioned U.S. Pat. No. 4,033,310, incorporated herein by reference, discloses another possible configuration for the present control circuitry of block 26, subject to the following modifications. The generated signal which is proportional to engine speed and load would in the present instance represent the desired timing of the start of combustion and the sensed parameter for error signal generation would now be the start of combustion rather than the injector-actuation. The resultant signal will control the actuator motor to effect a pump timing which satisfies the desired start of combustion characteristics. As in the above paragraph, suitable means for filtering or averaging the SOC signal or the error signal would normally be provided.

Each of the aforedescribed control circuits, while being generally suitable for the implementation of the present invention, possesses certain limitations. For instance, in U.S. Pat. No. 4,265,200, the coarse control signal is supplied hydraulically and is a function of engine speed only, and only a trim signal is provided via the closed-loop circuitry illustrated. That trim control is inherently slow in its response in order to avoid instability.

In U.S. Pat. No. 4,033,310, the pump timing is provided as a function of multiple engine operating conditions, thereby enabling the timing actuator motor to more rapidly respond to changes in multiple engine operating conditions. However, the correction signal which is added to the basic command or control signal is a proportional value of the error such that the error can never go to zero so long as any correction is needed. In either case, because the correction value is developed only as a function of the error resulting during the immediately past operating cycle, it may not adequately correct during intervals of rapidly changing operating condition if the correction actually required differs at different operating conditions.

Figure 2:
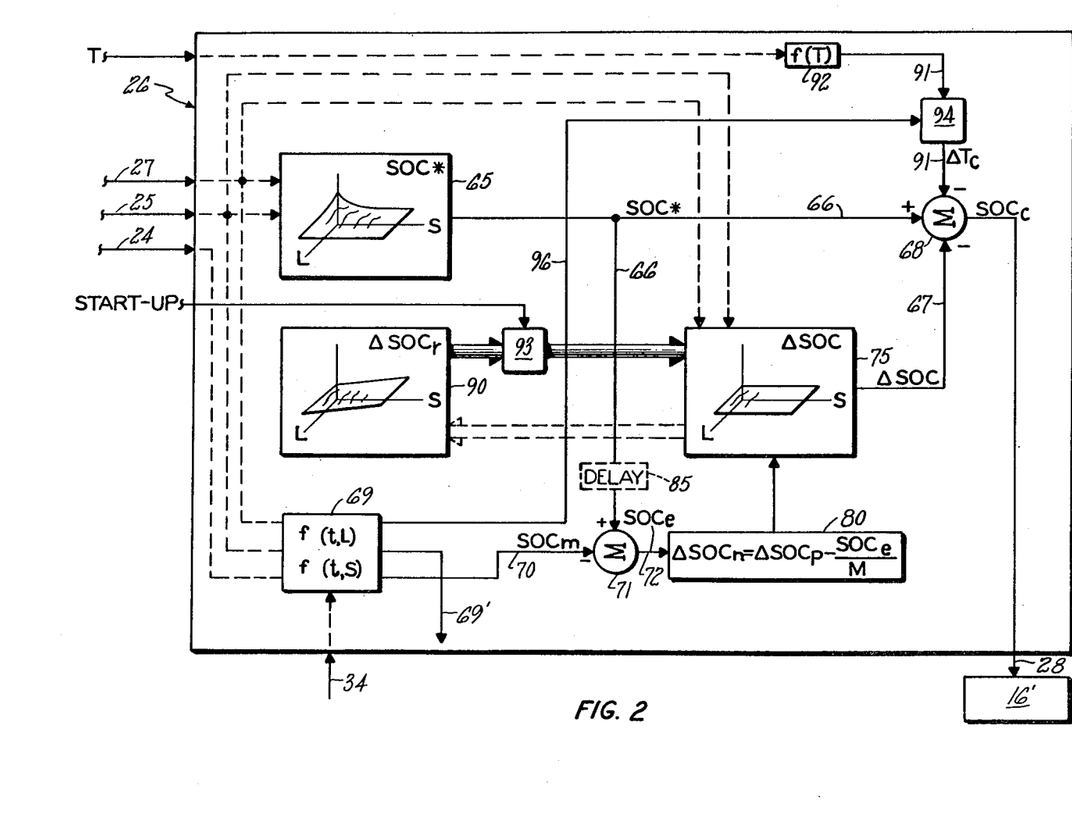
FIG. 2 is a functional block diagram of the timing control circuitry of the fuel control system of FIG. 1.

In accordance with an aspect of the invention, a preferred arrangement of control circuitry 26 is diagrammatically depicted in functional form in FIG. 2. Control circuitry 26 typically comprises a microprocessor or microcomputer, or a portion thereof, suitably programmed in a known manner for performance in accordance with the following functional description. It will be understood that appropriate digital-to-analog and analog-to-digital circuitry (not shown) is included to convert the signals from one form to the other. A number of digital words, for instance possibly 64 or 256, defining an optimized map of desired combustion angle (or time) settings as functions of engine speed (S) and load (L) are stored, as in an addressable ROM 65. These combustion angle settings are typically determined empirically by mapping a particular class of engine and fuel system, and reflect the timing of combustion which will provide desired fuel economy and reduction of exhaust emissions. The engine mapping is conducted using the particular start-of-combustion phenomenon to be sensed by sensors 30 in order to prevent any time disparities that may exist between two different types of start-of-combustion phenomena. These desired combustion angle settings are designated SOC* in the map stored in ROM 65 as depicted in FIG. 2. These SOC* settings identify the desired instant when combustion is to begin in a particular combustion chamber, and are expressed either as a time, or preferably an engine crank angle, relative to some reference. The reference is typically that of an engine part, normally the top dead center (TDC) position of a piston in the relevant cylinder. The mechanical linkage of the engine and fuel delivery apparatus 16 are typically set, as by a keying arrangement or the like, at the time of production and assembly such that fuel delivery at a normal position or status of the advance/retard mechanism coincides with fuel delivery at or near TDC, or possibly at some other fixed angular bias of the engine.

Because a significant delay exists from the time of fuel pump ejection until the actual start of combustion, typically due to various hydraulic and compression ignition delays, a second set or map of engine crank angle values is stored in additional ROM 90 and is designated $\Delta SOC_r$ as depicted in FIG. 2. Alternatively, the $\Delta SOC_r$ values may be established from engine mapping as a function of engine load and speed and will typically contain values which correspond either with some suitable nominal speed-load function for such engines or with a speed-load function which is predetermined to approximately correct or compensate each of the SOC* values for the predetermined or pre-estimated delays between pump actuation and the start of combustion. While respective SOC* values might be modified by the appropriate summation with corresponding $\Delta SOC_r$ values, variations of as much as 10°–15° in the actual onset of combustion may occur due to changes in temperature, fuel quality, humidity and the like. Therefore, in accordance with the invention, provision is made for changing the $\Delta SOC_r$ signal in a dynamic fashion to reflect such variations in the delay as determined from a direct measurement of the combustion event.

In functional operation of the preferred system, the $\Delta SOC_r$ map stored in ROM 90 is transferred to an addressable random access memory (RAM) 75 at each engine start-up, as represented by transfer control circuit 93. Then, during operation of the timing control system, the data stored in RAM 75 generally designated $\Delta SOC$ and initially comprising only $\Delta SOC_r$ values, is appropriately summed at junction 68 with corresponding SOC* data from ROM 65 as a function of then-existing engine speed and load conditions to provide a corrected time control signal $SOC_c$, also identified as signal 28, to actuate stepper motor 16' controlling the timing of fuel injection.

Upon the injection of fuel and its subsequent combustion within a combustion chamber of engine 10, a SOC timing signal 34 from sensor 30 and signal conditioning circuitry 32 is generated. SOC signal 34 is precisely indicative of the instant, and thus impliedly the angle, at which combustion starts. The SOC signal 34 then comprises an input to circuit 26 to provide feedback data of the response of engine 10 to the timing of the fuel delivery. Assuming the SOC* signal 66 and the corrected timing control signal 28 represent angular values, the SOC timing control signal 34 is converted from a pure time indication to one of angle, represented by the measured $SOC_m$ signal 70. The conversion is provided by appropriate circuitry 69, possibly also comprising part of a suitably programmed microprocessor, which considers the timing of SOC signal 34 relative to a reference event such as the TDC time indicated by signal 24 and in view of the speed of the engine indicated by signal 25.

The $SOC_m$ signal 70 is then compared with the desired SOC* signal 66 to obtain an error signal $SOC_e$ identified by reference numeral 72. The comparison is represented at and by the summation junction 71, and the error signal $SOC_e$ represents the magnitude and sense of the error. In the event no SOC signal 34 is provided to circuit 26 within some predetermined monitoring interval in each operating cycle, either because of sensor failure or because the fuel rack is closed at no load, the conversion circuitry 69 and summing junction 71 are conditioned to function such that the value of error signal $SOC_e$ is zero. The load signal 27 is additionally provided as an input to circuit 69, which circuit is additionally conditioned to provide a separate output signal 69' which may be provided to an annunciator if no SOC signal 34 occurs and the load signal 27 is not zero, thereby indicating failure of the SOC sensor.

Depending upon the duration of a SOC* signal on lead 66 to comparing junction 71, it may be desirable to include a suitable form of delay, as represented by dotted block 85, to ensure that the SOC* signal appears at junction 71 when the naturally delayed $SOC_m$ signal 70 for that particular SOC* signal also appears thereat. This need is particularly emphasized during rapidly changing operating conditions of a multicylinder engine when it is desired to compare the $SOC_m$ signal with the precise SOC* signal which was responsible for that $SOC_m$ response.

The error signal $SOC_e$ is then utilized, either directly or preferably as some numerically filtered or time-averaged quantity, to modify the $\Delta SOC$ angle value then stored in RAM 75 for the speed and load conditions which produced the error. The modification of the stored $\Delta SOC$ signal is such as to reduce the error the next time those particular speed and load conditions occur, assuming no further changes arise in the operating parameters. In the event no SOC signal 34 occurs, due to sensor 30 failure, the input of a zero $SOC_e$ value to modify the $\Delta SOC$ already stored in RAM 75 simply means that no update of that data will be made. However, it will be appreciated that the $\Delta SOC$ data already stored in RAM 75, or possibly a reload therein of $\Delta SOC_r$, will normally be sufficient in combination with the SOC* data to provide a fail-soft fully operational capability.

During operation of the engine, the ΔSOC map in RAM 75 is modified or updated by replacing a ΔSOC data word stored for a particular speed and load condition with a new data word for those same conditions in the event the error signal $SOC_e$ has a value other than zero. Alternatively, in its simplist configuration, a single correction independent of speed and load may be utilized to correct the ΔSOC map when a non-zero error signal $SOC_e$ occurs. In the preferred arrangement, that modification of the stored ΔSOC value as a function of the error developed for the same speed and load conditions is made utilizing a numerical filter represented by block 80, which minimizes the effect of the small by finite statistical variation associated with the actual combustion event. The numerical filter 80 may be included in a known manner as part of the program for a microprocessor. The value of ΔSOC to be newly stored in RAM 75, i.e. $ΔSOC_n$, equals the presently stored value of ΔSOC, i.e. $ΔSOC_p$, and the value of the instant error signal $SOC_e$ divided by some numerical constant M, i.e.

$$ΔSOC_n = ΔSOC_p - \frac{SOC_e}{M}.$$

The value of M will be dictated by the combustion statistics associated with a certain engine design. In practice, it has been found that a value in the range of approximately 3-8 is suitable to provide a sufficiently rapid update of engine operating conditions while maintaining a high degree of precision.

Tests of the SOC sensor 30 on various automotive diesel engines have revealed that the SOC signal 34 provides a timing signal accuracy of better than ±1.5° with an 80% reliability, based on "long term" operation of approximately 2000 revolutions of the engine. Viewed in another manner, in a test in which a series of 26 samples each comprised of a small number (i.e. 2-4) of consecutive combustion events was analyzed, it was determined that the arithmetic average for each and every sample was within ±1° of a "most probable" SOC angle determined by a long-term average.

In view of the foregoing discussion, it will be understood that the correction ΔSOC map in RAM 75 is automatically and quickly adjusted as a function of individual engine speed and load operating points to provide ΔSOC signals 67 which are used in conjunction with the SOC* signal 66 to provide $SOC_c$ signal 28. Assuming the ΔSOC values stored in RAM 75 are positive values representative of the crank angle delay between fuel pump actuation and start of combustion, then the negative sign at summing junction 68 associated with ΔSOC lead 67 signifies that the pump actuation timing must be advanced relative to SOC* signal 66 to provide combustion at the desired crank angle, SOC*.

During cranking or start-up of a diesel engine when the combustion chambers are relatively cold, i.e. at ambient air temperature, it is necessary to advance the timing of fuel delivery as a function of that temperature and relative to the combined value stored in the SOC* ROM 65 and the ΔSOC RAM 75 for those speed and load conditions to initiate combustion and complete start-up. For instance, in one automotive diesel engine, the amount of such advance additionally required may be in the range of 8° to 15° of crank angle for temperatures ranging from 30° C. down to −10° C. respectively.

Therefore, in the illustrated embodiment, to provide the indicated timing of fuel delivery via $SOC_c$ signal 28 during cold start-up, a further signal 91, additionally designated $ΔT_c$, is selectively extended to junction 68 for summing with the SOC* and ΔSOC signals, if deemed necessary. The $ΔT_c$ signal 91 is representative of the additional angle by which the fuel delivery should be advanced, as represented by the negative sign, at a certain temperature or temperature range of the air, the engine block or, preferably, the fuel. A function generator 92 receives the temperature signal T as an input and provides an appropriate output signal $ΔT_c$. In extreme examples, the function generator 92 might generate only a single value for $ΔT_c$ for all fuel temperatures T, or it may generate a large number of values each corresponding with a respective different fuel temperature T. In a preferred arrangement, only a limited number of $ΔT_c$ values are generated, each associated with a respective range of fuel temperatures T.

A gating circuit 94 having the $ΔT_c$ signal as an input from function generator 92 may be controlled by a gating signal 96 to extend the $ΔT_c$ signal to junction 68 only during cranking conditions. The gate control signal 96 is provided by the circuitry 69, or an adjunct thereto, such that gate 94 is enabled to pass the $ΔT_c$ signal only during engine cranking when no SOC signal is sensed from the engine. After a sufficient number of compression cycles have occurred to warm the engine and fuel to a level at which combustion begins and SOC signals are generated, the gate may be disabled and the $ΔT_c$ correction removed from the $SOC_c$ signal 28. It will be recalled that while no SOC signals are generated, the $SOC_e$ error signal has a value of zero. Once the SOC signals begin and the $ΔT_c$ correction signal is removed, and before the engine is fully warmed to normal operating temperature, the $SOC_e$ signal may have a relatively large value. These values of $SOC_e$, somewhat moderated by numerical filter 80, serve to modify the ΔSOC values in RAM to permit continued warm-up. As an optional alternative, gate 94 might be omitted and the signal $T_c$ decreased as a function of increasing temperature, with the adaptive capability of RAM 75 aiding in this regard.

While the described $SOC_c$ timing signal 28 is representative of an engine crank angle, and thus also a pump cam angle, to which the timing of actuation of the fuel delivery apparatus 16 should be advanced or retarded and may be analog or digital in form, depending upon the type of signal required to effect control of the controller 16', that signal might alternatively be representative of a time in the engine cycle at which a solenoid-actuated injector is to be actuated to inject fuel into the engine. In this latter instance, the signal would time the injector opening, and the subsequent delay until the onset of combustion would be somewhat less than from pump actuation, but the general control concept would be the same.

One major advantage of the present invention is that the need for time-consuming and often complex adjustment of the mechanical interrelationship of the fuel pump and the engine at the time of assembly to then attain precise timing is generally obviated. Instead, by establishing a mechanical relationship between the engine and pump which is approximately as desired, as by the aforementioned keying or a similarly simple referencing technique, the open-loop timing command obtained from ROM 65 and RAM 75 is sufficient to provide at least functional timing commands and the further adaptive provision for modifying or correcting the ΔSOC data in RAM 75 ultimately corrects for any inaccuracies or errors contained in the set-up timing.

An optional further feature is a provision for periodically returning the corrected ΔSOC map stored in RAM 75 to memory 90 for use as the ΔSOC reference at the next engine start-up, assuming RAM 75 is of the volatile type in which its contents are lost when power is removed. In such instance, memory 90 would be of the programmable type, such as an EEPROM, and the map from RAM 75 would be entered in it periodically and/or during some brief interval in which power is maintained at shutdown. This capability would insure that upon successive engine start-ups the timing system would immediately include all corrections previously made to the very first ΔSOC map after it was entered in RAM 75, rather than requiring those corrections be made again by operation of the engine following each start-up.

Figure 3:
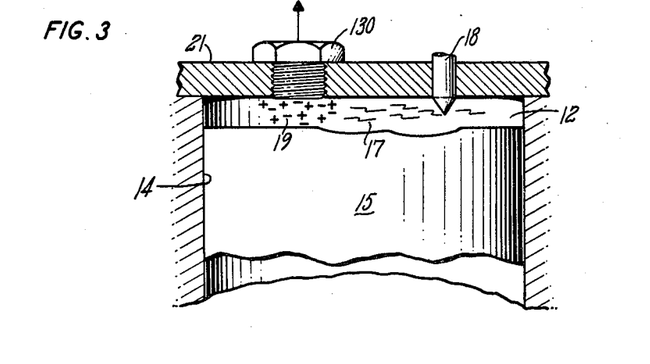
FIG. 3 is a diagrammatic sectional view illustrating the sensor of the start of combustion indicating signal generator positioned in operative relation with a combustion chamber of the diesel engine.

Referring to FIG. 3, there is illustrated one general form of the SOC sensor, here designated 130, positioned in operative relationship with the combustion chamber 12 of cylinder 14. A piston 15 is illustrated in cylinder 14 near the TDC position at the moment combustion begins following injection of fuel by injector 18. The combustion chamber 12 is accompanied by the emission of electromagnetic radiation, such as photons 17, and by ionization of the air/fuel mixture, represented by electrical charges 19. The sensor 130 of FIG. 3 is optical in nature and detects the electromagnetic radiation or emission of photons 17 coincident with combustion. Sensor 130 is mounted in the head 21 of engine 10 such that it is in optical communication with the light-emitting combustion process in combustion chamber 12.

Figures 4, 5, 7:
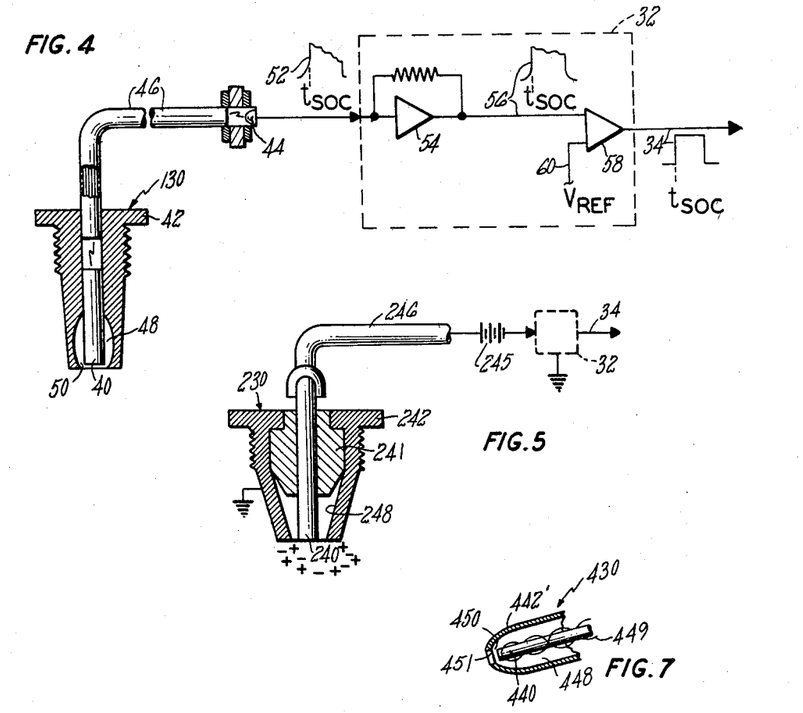
FIG. 4 illustrates one embodiment of a start-of-combustion signal generator.
FIG. 5 illustrates an embodiment of an electrostatic start-of-combustion signal generator.
FIG. 7 illustrates a portion of a modified embodiment of the FIG. 4 signal generator in which the sensor is combined with a glow plug.

Referring to FIG. 4, the optical SOC sensor 130 is illustrated in greater detail in combination with its signal developing and conditioning circuitry 32 utilized to generate the start of combustion timing signal 34. The optical sensor 130 includes an optical element, such as a quartz or sapphire rod 40 which acts as a viewing window having a proximal end suitably embedded in a metal mounting plug 42 which is adapted to be threadably inserted into the head 21 of engine 10. Optical element 40 is bonded by means of a high-temperature cement or is brazed to plug 42 to provide a high temperature, high pressure, gas-tight seal. Optical coupling is provided between the mounted end of optical rod 40 and a suitable transducer, such as photodiode 44. Photodiode 44 also forms part of sensor 130 and converts the sensed electromagnetic radiation or light into an electrical signal. The photodiode 44 may either be directly housed in or mounted on plug 42 or preferably, is spaced therefrom to minimize the adverse effects of heat and is optically coupled with element 40 by means of a fiber optic cable 46. The facing end portion of fiber optic cable 46 is retained in a central bore in mounting plug 42 in close facing relationship with optical rod 40 by suitable means not specifically illustrated, such as a collar clamp. A dust cover, such as a protective boot, may supplement the mounting of fiber optic cable 46 to mounting nut 42. The opposite end of fiber cable 46 is mounted and maintained in fixed operative relation with photodiode 44 in a suitable manner which insures good optical coupling.

The formation and/or accumulation of soot or carbon on the front face of optical rod 40 is substantially eliminated and the rod is physically protected by locating the distal end of that rod within a circumferential gas plenum 48 formed with plug 42 and by maintaining that end of the rod at an elevated temperature. The plenum 48 surronds the optical rod 40 along its distal end. The diameter of the plenum adjacent the distal end of rod 40 gradually decreases to form a narrow annular orifice 50 between the plug 42 and the extreme distal end of rod 40 to increase the gas velocity and thus the cleansing action in that region. The gases within cylinder 14 and combustion chamber 12 are compressed into the plenum 48 during the compression stroke and rapidly exit therefrom through the orifice 50 during the power stroke, thereby aiding in the desired cleansing of the optical rod 40. The rod 40 is of a material which is a poor thermal conductor and extends about one centimeter or more from its point of mounting contact with plug 42 to maintain its distal end, during engine operation, at a temperature sufficiently high to impede the accumulation of occluding deposits by inhibiting condensation and by producing dry carbonized material which is easily removed by the high velocity gas flow from the plenum. The temperature at the distal end of rod 40 is typically about 425° C.

Referring to the signal-developing circuitry 32, the light which accompanies combustion within chamber 12 and which is sensed by rod 40 and is converted by photodetector 44 to an electrical signal is represented by the current waveform 52 which comprises an electrical analog of the intensity of the light detected. The signal 52 comprises the input to circuitry 32. It will be noted that the signal 52, as a function of time, exhibits a very rapid increase at the onset of combustion. The time of this increase is designated $T_{SOC}$ herein. The magnitude of the signal may continue to increase thereafter, but at a slower rate, and then diminishes as the excitation accompanying combustion diminishes. The current signal 52 is passed through a current-to-voltage converter 54 which provides the output signal voltage having the waveform 56. The converter 54 is provided with sufficient gain to drive it into saturation and thereby provide the resulting waveform 56 with a particularly steep wave front at time $T_{SOC}$. The amplitude of signal 56 at time $T_{SOC}$ is relatively large and that signal is then extended to an input of comparator 58 having a much smaller reference voltage 60 applied to its other input. When the signal 56 exceeds the reference voltage 60 at time $T_{SOC}$, the comparator 58 provides an output signal 34 having a squared, substantially vertical wave front at time $T_{SOC}$ which is utilized as the start of combustion (SOC) timing signal. It will be appreciated that additional circuitry (not shown) may be utilized if it is wished to convert the leading edge of the waveform 34 at time $T_{SOC}$ to a single spike rather than the leading edge of a square wave pulse. In either event, the very short rise time of the signal at time $T_{SOC}$ provides a precise signal for accurately identifying the onset of combustion in a combustion chamber and is utilized as the SOC timing signal 34 provided to control circuit 26.

Figure 6:
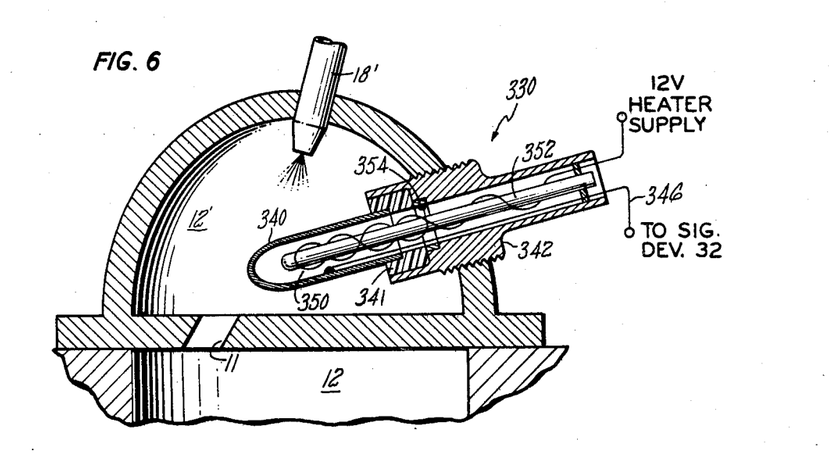
FIG. 6 illustrates a modified embodiment of the FIG. 5 signal generator with the sensor combined with a glow plug and positioned in a prechamber.

Alternate forms of a SOC sensor which rely on the detection of the ionization resulting from combustion of the air/fuel mixture are depicted in FIGS. 5 and 6. FIG. 5 depicts a basic form of ionization or electrostatic type SOC sensor, here designated 230. The combustion of fuel within diesel engine 10 results in the rapid formation of ions in the combustion chamber and/or the precombustion chamber during fuel combustion. A rapid increase in the level of ionic charges occurs at the instant combustion begins. The electrostatic sensor 230 is intended to sense this rapid increase in the ionization level and convert it to an electrical SOC timing signal 34.

A center electrode 240 is mounted in a suitable metallic mounting plug 242 via the intermediate supporting and electrically insulating structure of ceramic insulator 241. The electrode 240, insulator 241 and mounting plug 242 are hermetically bonded to one another, as with a suitable heat resistant cement, or are brazed to insure the pressure integrity within the combustion chamber. The mounting plug 242 of FIG. 5 may be threaded into a threaded opening through the head of engine 10 to place it in communication with the respective combustion chamber 12. The innermost end of electrode 240 may be substantially flush with the inner end of plug 242 and preferably is relatively short such that it remains relatively cool to avoid the emission of electrons. The center electrode 240 is spaced from the inner circumference of the mounting nut 242 such that an annular or circumferential plenum 248 is formed therebetween. The insulator 241 includes a tapered surface for increasing the length of that surface between the plug 242 and the center electrode 240 to minimize electrical leakage. The tapered insulator 241 and the plenum 248 introduce certain turbulences to the gases entering that area to promote the avoidance or elimination of soot formation on the electrode 240 and the surface of the insulator.

The plug 242 is in direct electrical connection with the engine 10, typically at ground potential. A source 245 of a small finite DC voltage, i.e. 5 volts, is applied to the electrode 240 via an electrical connecting cable 246 for facilitating the establishment of an electrical current flow through the electrode and the cable as a result of the ionic charges developed by combustion in the combustion chamber 12. The direction of current flow is a function of the polarity of the applied voltage. The developed current is proportional to the level of ionization in the combustion chamber which in turn reflects the level of activity in the combustion process. That electrical current, appearing in conductor 246, is applied as the input to signal developing circuitry 32 constituted in substantially the same manner as hereinbefore described.

Since operation of the electrostatic sensor 230 is predicated on electrical charges from the combustion process arriving at electrode 240, the precise location of this sensor within the combustion chamber is important. Specifically, combustion takes place more nearly in the center of the chamber in a region which varies in size in relation to the engine operating speed and load conditions. Accordingly, the timing and the intensity of the ionization signal sensed by sensor 230 is dependent upon its positioning in the chamber relative to the origin of the combustion process. In view of this consideration and because there may be little or no additional room available in the head of certain diesel engines for the installation of additional structural elements, the SOC sensor may be incorporated with other functional engine elements.

Accordingly, referring to FIG. 6, there is illustrated yet another embodiment of the electrostatic SOC sensor, here designated 330. In this embodiment, the SOC sensor 330 takes the shape of a conventional glow plug heater normally inserted in the prechamber 12' associated with many diesel engines. In certain instances, the SOC sensor and glow plug heater may be combined in a single structural element. The prechamber 12' is typically mounted above and communicates with the main combustion chamber 12 via an orifice 11. The fuel injector nozzle 18' is mounted so as to inject fuel into the prechamber 12' where it undergoes preliminary combustion and is expelled via orifice 11 to the main combustion chamber 12 for the completion of combustion. Typically, glow plugs are mounted in each of the prechambers 12' to facilitate ignition of the fuel in the prechamber, particularly during start-up and especially cold weather start-up. The structural configuration and positioning of the glow plug structure within prechamber 12' relative to the fuel injection path is known to be critical and has been optimized by various engine manufacturers. Accordingly, that portion of SOC sensor 330 which extends within prechamber 12' has been configured and dimensioned externally and positioned to conform as nearly as possible to the configuration and positioning of that portion of a conventional glow plug normally inserted into such prechamber.

The electrostatic SOC sensor 330 operatively positioned in prechamber 12' in FIG. 6 is comprised in the main of a metal mounting plug 342, an ionization sensing electrode 340 and an insulator 341 which is positioned between and electrically isolates the electrode 340 from the mounting plug 342 and thus from the engine 10. The mounting plug 342 is conveniently threaded into the threaded opening in the wall of a prechamber 12' which normally receives a glow plug. The mounting plug 342 typically includes an axial bore therethrough for housing certain electrical elements to be hereinafter described. The longitudinally inner, or distal, end of plug 342 includes an annular seat in which is positioned an annular ceramic insulator 341 hermetically sealed thereto by a suitable heat resistant cement. An annular recess in the longitudinally inner, or distal, wall of the insulator 341 provides a seat for the proximal end of the electrode 340 which is hermetically sealed thereto by a suitable heat resistant cement. The electrode 340 is provided with a surface geometry and configuration which closely conforms to that of the glow plug heater designed for utilization in the particular prechamber 12'. Typically, the electrode 340 is a tubular metal shell having a blind, or closed, distal end and being open at its proximal end which is in seated engagement with insulator 341.

To provide the requisites of an ionization sensor, it is only necessary that an electrical conductor 346 be connected at one end to the electrode 340 and that its other end be led out through the bore in plug 342 to signal conditioning circuitry, as for instance circuit 32 illustrated in FIG. 4. Additionally, a source of signal developing voltage analogous to source 245 in FIG. 5 may be connected to the lead 346.

The structure comprising electrostatic SOC sensor 330 in FIG. 6 may include additional elements to enable it to operate cooperatively or alternatively as a glow plug for the purpose of facilitating fuel combustion in the prechamber 12' during cold start-up conditions. For instance, the SOC sensor 330 may include an elongated rigid spar 352 mounted thereto and extending coaxially within the central bore in a manner analogous to a conventional glow plug. The spar 352 may be of heat resistant material and is preferably an electrical insulator, as for instance a ceramic. A wire-like heating element 350 is wound about the distal end of spar 352 which is positioned within the recess formed by electrode 340. One end of heater wire 350 is placed in electrical connection with the engine 10, as by connection with conductive ring 354 seated in electrical contact with plug 342. The other end of heater wire 350 may be led out through the rear of the sensor structure for selective connection to a source of electrical power, as for instance the 12 volt supply of an automobile. The proper placement of insulating supports and/or insulating coatings on the respective conductors 346 and 350 insure their electrical isolation from one another and from certain elements of the sensor structure.

The optical SOC sensor 130 described with reference to FIGS. 3 and 4 may also be structured similar to the external structure of the electrostatic SOC sensor 330 of FIG. 6 to provide a sensor configuration which conforms externally to that of a conventional glow plug for introduction to the prechamber 12'. Moreover, the optical SOC sensor may include a heating element to function as a glow plug. Specifically referring to FIG. 7, a portion of an optical SOC sensor 430 is illustrated in which the base plug or mounting structure includes a tubular extension 442' having an external geometry which substantially conforms to that of a conventional glow plug and to the electrode 340 of the electrostatic SOC sensor 330 of FIG. 6. The optical element 440 is generally longer than its counterpart illustrated in FIG. 4, and a suitable heating element 449 is concentrically disposed about the element 440 within plug extension 442' for providing heat during start-up. An aperture 451 in the distal end of extension 442' is in optical registry with the distal end of optical element 440 to provide the necessary optical path to the combustion site. The aperture 451 is sized and positioned relative to the distal end of the optical element 440 to form a narrow annular orifice 450 therabout for the high speed entry and exhaust of gases to and from the plenum 448 for cleaning the optical element.

It will also be understood that a multicylinder diesel engine may be provided with SOC sensors in one, all, or less than all, of the combustion and/or precombustion chambers of the engine in developing the requisite timing control signals. The utilization of more than one SOC sensor not only improves the precision of timing control, but also may provide engine diagnostic information. If the engine includes precombustion chambers, each precombustion chamber may be equipped with a SOC sensor having the dual capabilities of generating a signal indicative of the start of combustion and providing heat to facilitate the combustion of fuel in the prechamber during start-up. Alternatively, one prechamber may be provided with a SOC sensor capable only of providing a SOC timing signal and the remaining prechambers would include conventional glow plugs having no SOC sensing capability. Moreover, the SOC sensor might instead be incorporated in the structure of the injector so as to minimize the number of penetrations of the combustion chamber wall, this being of particular value in direct injection engines which do not have a precombustion chamber and a glow plug entry.

Although this invention has been shown and described with respect to detailed embodiments thereof, it will be understood by those skilled in the art that various changes in form and detail thereof may be made without departing from the spirit and scope of the claimed invention. It will be appreciated that the invention described herein provides an improved fuel delivery timing control for diesel engines and can be implemented on a fully electronic fueling control or in conjunction with a mechanical or hydraulic-mechanical governor control without departing from the spirit of the invention. Moreover, although detailed discussions of an optical and an electrostatic SOC sensor exist herein, it will be appreciated that SOC sensors which respond to other SOC phenomena are within the ambit of the invention. For instance, rapid-response temperature sensor, or similarly rapid sound and/or pressure transducers, or the like might also be used.

We claim:

1. A fuel timing control system for a compression ignition engine comprising:

means for delivering fuel to the engine for combustion therein, said fuel delivery means being responsive at least to a timing control signal for controlling the timing of the delivery of fuel to a combustion chamber of the engine for combustion therein;

means for supplying a predetermined timing control signal representative of a desired timing of the onset of combustion in a said combustion chamber;

means responsive to a particular phenomenon which exhibits a relatively rapid level change coincident with and resulting from the onset of combustion in a said combustion chamber of the engine for providing a signal directly and precisely indicating the timing of the instant of actual onset of combustion in a said combustion chamber;

means for providing an engine timing signal representative of an engine reference position;

means for providing a signal indicative of engine speed;

said engine timing signal providing a common reference for both said desired onset of combustion signal and said actual onset of combustion signal;

said predetermined timing control signal supplying means being responsive to said speed signal to supply a said predetermined timing control signal as a function thereof;

means for comparing the signal indicative of the timing of the actual instant of the onset of combustion with said predetermined timing control signal to provide an error signal indicative of the timing difference therebetween;

means for automatically correcting said predetermined timing controlling signal, said corrected timing control signal being said timing control signal for controlling the timing of fuel delivery by said fuel delivery system to effect said desired timing of said onset of combustion, said means for correcting said predetermined timing control signal including retrievable storage means, means for forming at least one correcting signal and storing said correcting signal in said storage means, and means for combining said correcting signal with said predetermined timing control signal in a manner such that said corrected timing control signal tends to reduce said error signal, said means for forming a said correcting signal including means for adding a fraction less than unity of a said error signal to a correcting signal previously stored for the same speed condition such that said correcting signal represents substantially the most probable start of combustion timing under the same speed condition.

2. The fuel timing control system of claim 1 further including means for providing a signal indicative of engine load, said predetermined timing control signal supplying means also being responsive to said load signal to supply said predetermined timing control signal as a function thereof, and a said correcting signal is stored in said storage means also in accordance with the same load conditions.

3. The fuel control system of claim 2 wherein said fraction of the presently determined error signal is in the range of about ⅛ to ⅓ of said error signal.

4. The fuel control system of claim 2 wherein said comparing means periodically determines said error signal at a rate proportional to the engine cycling period.

5. The fuel control system of claim 2 wherein said means for correcting said predetermined timing control signal includes, as a portion thereof, means responsive to an operating temperature associated with said engine for generating a correcting signal which is a function of said temperature, said temperature-dependent correcting signal being operatively applied to at least partly correct said predetermined timing control signal during an engine warm-up interval.

6. The fuel control system of claim 5 wherein said temperature-dependent correcting signal is applied to correct said predetermined timing control signal only prior to the initiation of any combustion events during engine start-up.

7. The fuel control system of claim 2 wherein said means for correcting said predetermined timing control signal includes random access storage means having multiple storage addresses, said storage addresses being functions of said engine speed and load signals, a respective correcting signal being stored at each of said storage addresses and being retrieved from the respective address corresponding to the engine speed and load conditions existing when said predetermined timing control signal is being corrected.

8. The fuel control system of claim 7 wherein said predetermined timing control signal supplying means comprises additional storage means, said additional storage means having a plurality of selectively readable addresses corresponding with respective conditions of engine speed and load, said timing control signals being predetermined and stored at respective said addresses of said additional storage means.

9. The fuel control system of claim 7 including further storage means, said further storage means being non-volatile and having multiple storage addresses, said addresses being functions of engine speed and load signals, a respective reference correcting signal being stored at each of said further storage means addresses, and means for transferring said reference correction signals from said further storage means to respective said addresses of said random access storage means at each engine start-up, said correcting signals initially stored in said random access storage means following said engine start-up comprising said transferred reference correcting signals.

10. A method for controlling the timing of the onset of combustion in a compression ignition engine, whereby fuel delivery means deliver fuel to a combustion chamber in response to a timing control signal for combustion thereat, comprising the steps of:

sensing a phenomenon in said combustion chamber which results from and is directly representative of the onset of combustion therein and generating therefrom an electrical signal directly and precisely indicating the timing of the instant of actual onset of combustion;

supplying electrical preliminary timing control signals, said preliminary timing control signals being predetermined by mapping a representative said engine, said engine mapping including, sensing the timing of phenomenon indicative of the onset of combustion relative to a predetermined engine reference position as a funtion of speed and load for said engine;

automatically comparing the signal indicative of the timing of the actual onset of combustion with said preliminary timing control signal to provide a deviation signal indicative of the timing difference therebetween;

automatically modifying said preliminary timing control signals, said modified timing control signals being said timing control signals for controlling the timing of fuel delivery by said fuel delivery means, including the steps of retrieving from storage an electrical correction signal stored at an address corresponding with the existing engine speed and load conditions, said correction signal having been previously formed by the step of adding a fraction less than unity of a said deviation signal with a said correction signal then in storage at the address corresponding with the same speed and load conditions, and summing said retrieved correction signal with said preliminary timing control signal for providing said modified timing control signal in a manner which tends to reduce said deviation signal; and wherein said steps of supplying a preliminary timing control signal, of comparing of said start of combustion signal and said preliminary timing control signal to provide a deviation signal, and of modifying said preliminary timing control signal each occur periodically at a rate determined by the engine cycling frequency.

* * * * *